United States Patent
Huang et al.

(10) Patent No.: US 7,471,640 B2
(45) Date of Patent: Dec. 30, 2008

(54) SCALABLE QAM SYSTEM AND METHOD

(75) Inventors: Cheng-Yi Huang, Yilan (TW); David W. Lin, Hsinchu (TW); Chih Peng Fan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1021 days.

(21) Appl. No.: 10/748,031

(22) Filed: Dec. 31, 2003

(65) Prior Publication Data

US 2005/0100050 A1 May 12, 2005

(30) Foreign Application Priority Data

Nov. 6, 2003 (TW) ............... 92131033 A

(51) Int. Cl.
- *H04J 1/16* (2006.01)
- *H04J 3/16* (2006.01)
- *H04J 3/24* (2006.01)
- *H04L 27/36* (2006.01)
- *H04L 23/02* (2006.01)

(52) U.S. Cl. ............... 370/252; 370/465; 370/474; 375/261; 375/298

(58) Field of Classification Search ............... 370/252, 370/465, 474; 375/240.29, 261, 298
See application file for complete search history.

(56) References Cited

U.S. PATENT DOCUMENTS

| | | | |
|---|---|---|---|
| 5,828,695 A | 10/1998 | Webb | |
| 6,400,928 B1 * | 6/2002 | Khullar et al. | 455/67.11 |
| 6,404,755 B1 | 6/2002 | Schafer | |
| 6,490,270 B1 * | 12/2002 | Krishnamoorthy et al. | 370/347 |
| 6,636,500 B2 * | 10/2003 | Krishnamoorthy et al. | 370/347 |
| 6,917,384 B1 * | 7/2005 | Fukushima | 348/333.03 |
| 7,027,532 B2 * | 4/2006 | Lauer | 375/341 |
| 7,043,210 B2 * | 5/2006 | Zhu et al. | 455/102 |
| 7,142,611 B2 * | 11/2006 | Wang | 375/262 |
| 7,277,498 B2 * | 10/2007 | Hanaoka et al. | 375/316 |
| 2002/0155829 A1 * | 10/2002 | Proctor et al. | 455/423 |
| 2003/0165157 A1 * | 9/2003 | Pollmann et al. | 370/465 |
| 2004/0039983 A1 * | 2/2004 | Brossier et al. | 714/758 |
| 2004/0162071 A1 * | 8/2004 | Grilli et al. | 455/435.1 |

* cited by examiner

*Primary Examiner*—Firmin Backer
*Assistant Examiner*—Nittaya Juntima
(74) *Attorney, Agent, or Firm*—Birch, Stewart, Kolasch & Birch, LLP

(57) ABSTRACT

A scalable QAM system and communication method. High-level QAM signals are broadcast from a transmitter. The transmitter comprises a scalable frame structure in a MAC layer and a bitmap method in a physical layer transmitting modulated signals with data distributed in different bit positions. Each client determines whether to demodulate all the received data on the bit plane or only a portion of the data in certain bit positions according to the transmission quality (SNR) of the received signal, in order to acquire a lower bit error rate and improve the efficiency of the transmission bandwidth.

14 Claims, 5 Drawing Sheets

SCALABLE QAM SYSTEM AND METHOD

This Nonprovisional application claims priority under 35 U.S.C. § 119(a) on Patent Application No. 092131033 filed in TAIWAN on Nov. 6, 2003, the entire contents of which are hereby incorporated by reference.

BACKGROUND OF THE INVENTION

1. Field of the Invention

The present invention relates to a quadrature amplitude modulation (QAM) communication technique, and more specifically, to a scalable QAM communication method, transmitter, and communication system.

2. Description of the Related Art

The QAM modulation technique is frequently implemented in networks with share media, wherein the downlink signals are broadcast to network clients. Examples of such network are digital cable modem, digital television, and 802.16 broadband wireless system. The system service provider broadcasts signals to each network client, however, the signal quality received by each client is different, as the clients are located at different positions and are under different environmental condition. In order to maintain a low uncoded transmission bit error rate, the service provider uses a lower level QAM, for example, 64QAM to modulate the signals. The bandwidth efficiency of the downlink channel is thus restricted by the level of QAM used for modulation.

FIG. 1 shows the topology of the network in the related art which transmits data to shared media, and broadcasts signals over the downlink channel. A transmitter 102 is usually the service provider of the communication system, and the transmitter 102 connects clients 104, 106, and 108 through a network 100. The transmitter 102 broadcasts a QAM modulated signal to the network 100, and the clients 104, 106, and 108 receive the QAM modulated signal sent by the transmitter 102 through the network 100. The signal to noise ratio (SNR) of the signal received by the client 104 is 25 dB, thus the client 104 can only receive and demodulate the 64QAM modulated signal. The SNR of the signal received by the client 106 is 30 dB, enabling the client 106 to receive both 64QAM and 256QAM modulated signals. Furthermore, if the SNR of the signal received by the client 106 is 35 dB, the client 106 can receive 64QAM, 256QAM, and 1024QAM modulated signals as the client 106 is able to demodulate all these signals correctly. The transmitter 102 in this case, however, can only modulate the 64QAM signal in order to allow all the clients 104, 106, and 108 to be able to receive and demodulate the modulated signal correctly.

SUMMARY OF THE INVENTION

The object of the present invention is to provide a scalable QAM communication technique for improving the network transmission rate, overcoming the variable interference of the transmission channel, and maintaining a reasonable low demodulation error rate.

In order to achieve these objects, the present invention provides a scalable QAM communication technique in which a transmitter broadcasts a single high level efficiency QAM modulated signal wherein signal transmission is accomplished by distributing the bit data in different bit positions through combining the scalable frame structure control of the media access control (MAC) layer and the bitmap technique of the physical layer. Each downlink client can decide to receive all the data on the bit plane or only a portion of the data on certain bit positions according to the transmission quality of the received signal.

The scalable QAM communication technique disclosed in the present invention includes a scalable QAM communication method, a transmitter, and a communication system. The scalable QAM communication method comprises distributing bit data in different bit positions for transmission, combining the bit data in different bit positions, modulating the combined signal according to a QAM technique, and broadcasting the QAM modulated signal over a channel.

The scalable QAM transmitter of the present invention comprises a media access controller, encoders, and a bitmap device. The media access controller sends different types of MAC messages, the encoders generate different types of bit data using different types of channel encoding methods to encode the different types of MAC messages, and the bitmap device assigns the different types of bit data to different bit positions, and combines the data of different bit positions to generate a component signal.

Furthermore, the scalable QAM communication system of the present invention comprises a transmitter and a plurality of clients. The transmitter distributes bit data in different bit positions for transmission, combines data on the different bit positions, modulates the combined signal using the QAM technique, and then broadcasts the QAM modulated signal to a channel. The clients then receive the signal from the channel, and each client determines whether to demodulate all data on the bit plane or just certain bit positions according to the transmission quality of the received signal.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
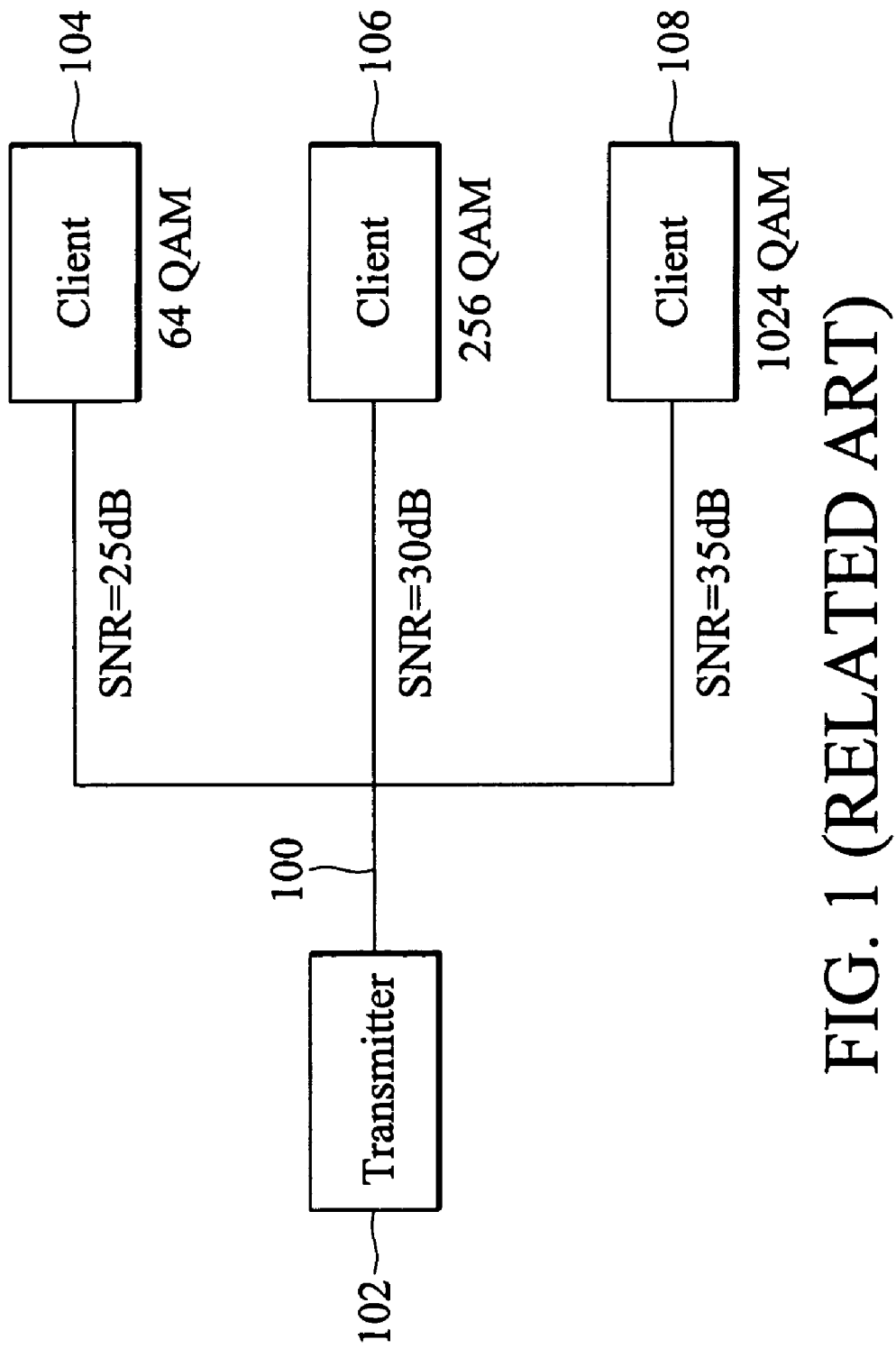
FIG. 1 illustrates the network topology of the related art which has shared media and broadcasts signals over the downlink channel.
Figure 2A:
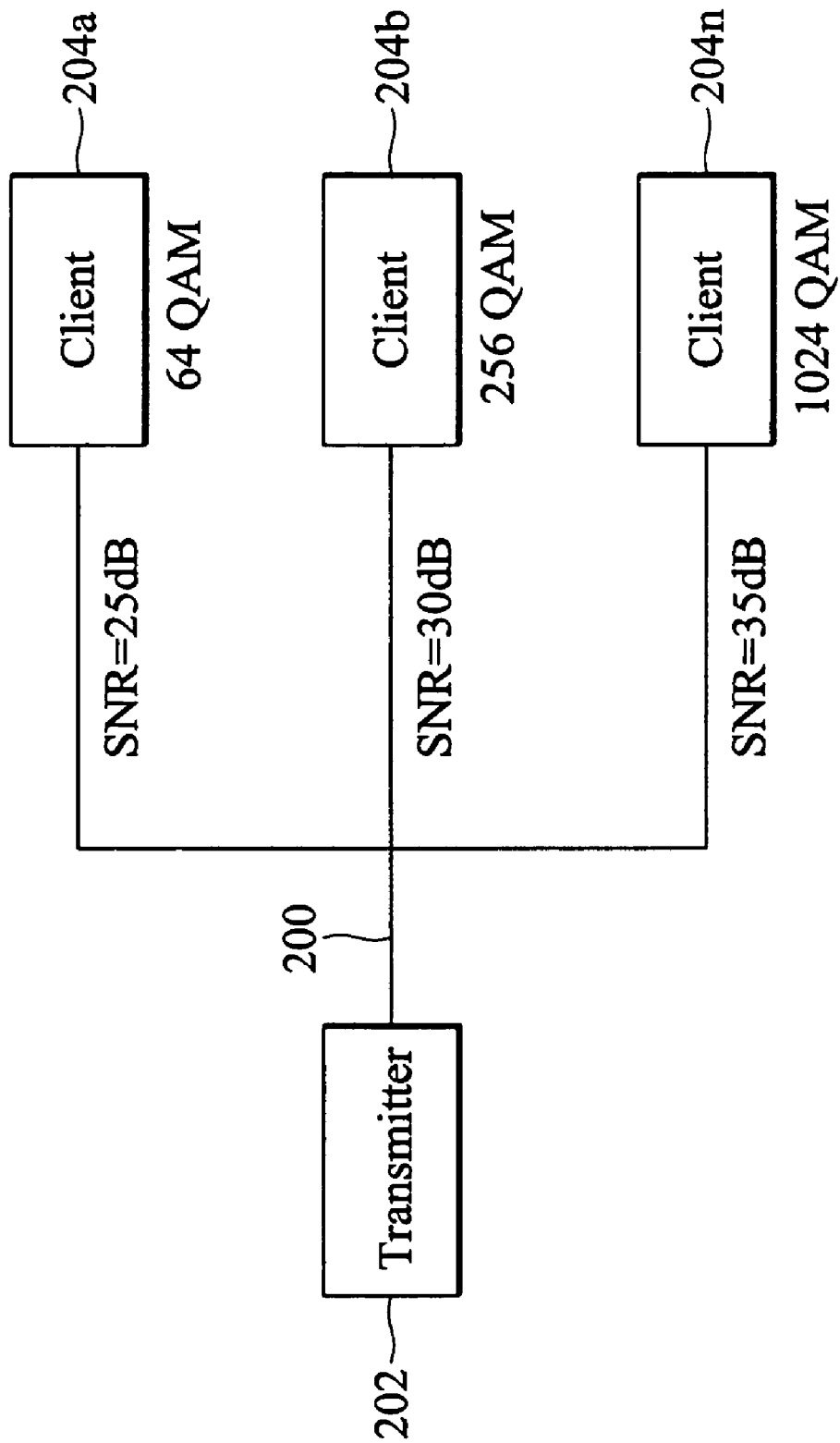
FIG. 2a illustrates the network topology of the scalable QAM communication system according to the embodiment of the present invention.
Figure 2B:
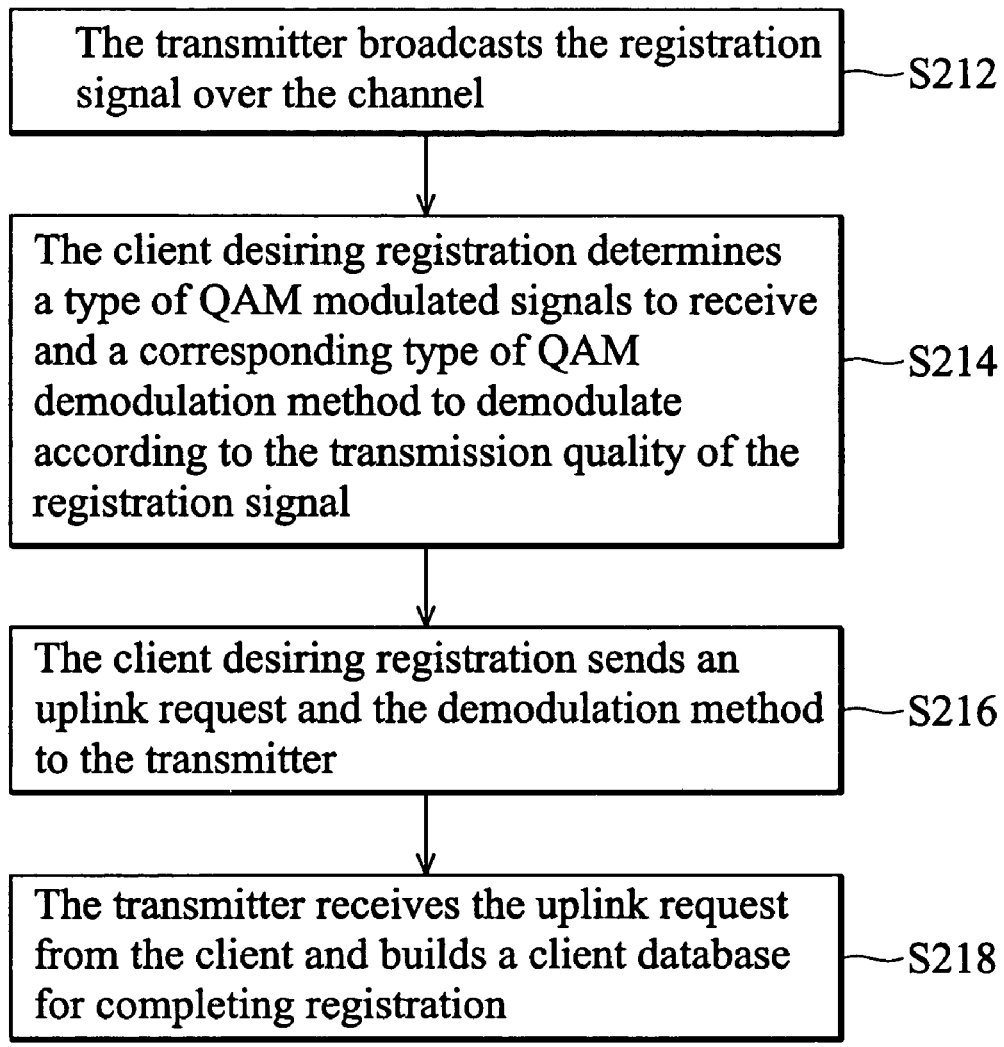
FIG. 2b is a flowchart showing the client registration procedure according to the embodiment of the present invention.

The scalable QAM communication system disclosed in the present invention can be implemented in a digital cable modem, interactive digital satellite/terrestrial/cable set-top box/digital TV, or 802.16 broadband wireless communication system. This communication system applies to a network with shared media, and the system transmits signals by broadcasting over the downlink channel. As shown in FIG. 2a, FIG. 2a illustrates the network topology constructed by the scalable QAM communication system according to the embodiment of the present invention. A transmitter 202 connects to clients 204a, 204b, . . . , 204n through a network 200. The clients 204a~204n receive a broadcast signal, unicast signal, or multicast signal from the transmitter 202 after completing the registration procedure. In the present embodiment, the SNR of the signal received by the client 204a is 25 dB, thus the client 204a can only correctly demodulate the 64QAM modulated signal. The SNR of the signals received by the client 204b~204(n-1) are 30 dB, thus these clients can correctly demodulate both the 64QAM and 256QAM modulated signals. The SNR of the signal received by the client 204n is 35 dB, representing that the client 204n can precisely demodulate all the 64QAM, 256QAM, and 1024QAM modulated signals. FIG. 2b shows a flowchart of the registration procedure of a client according to the embodiment of the present invention. The transmitter 202 first broadcasts the registration signal for the channel 200 (step S212), the registration signal is the highest level QAM modulated signal the system is capable of, which in the present embodiment, is the 1024QAM modulated signal. Moreover, the registration data is placed in the bit position with the most significant bit (MSB).

The clients desiring registration determine the type of QAM modulated signal to receive, as well as the demodulation method (step S214) according to the transmission quality of the registration signal. For example, the signal received by a client 204 desiring registration has an SNR of 25 dB, thus the client 204 can only demodulate 64QAM modulated signal correctly. Although the registration signal is a 1024QAM modulated signal, the client 204a can still obtain registration data because the registration data is on the MSB bit position.

The clients desiring registration then send an uplink request and demodulation method to the transmitter 202 (step S216), for example, the client 204a desiring registration transmits an uplink request to the transmitter 202, as well as notifying the transmitter 202 that the demodulation method used is the 64QAM method.

The transmitter 202 builds a client database when receiving the uplink request from the client in order to complete client registration (step S218).

Figure 3:
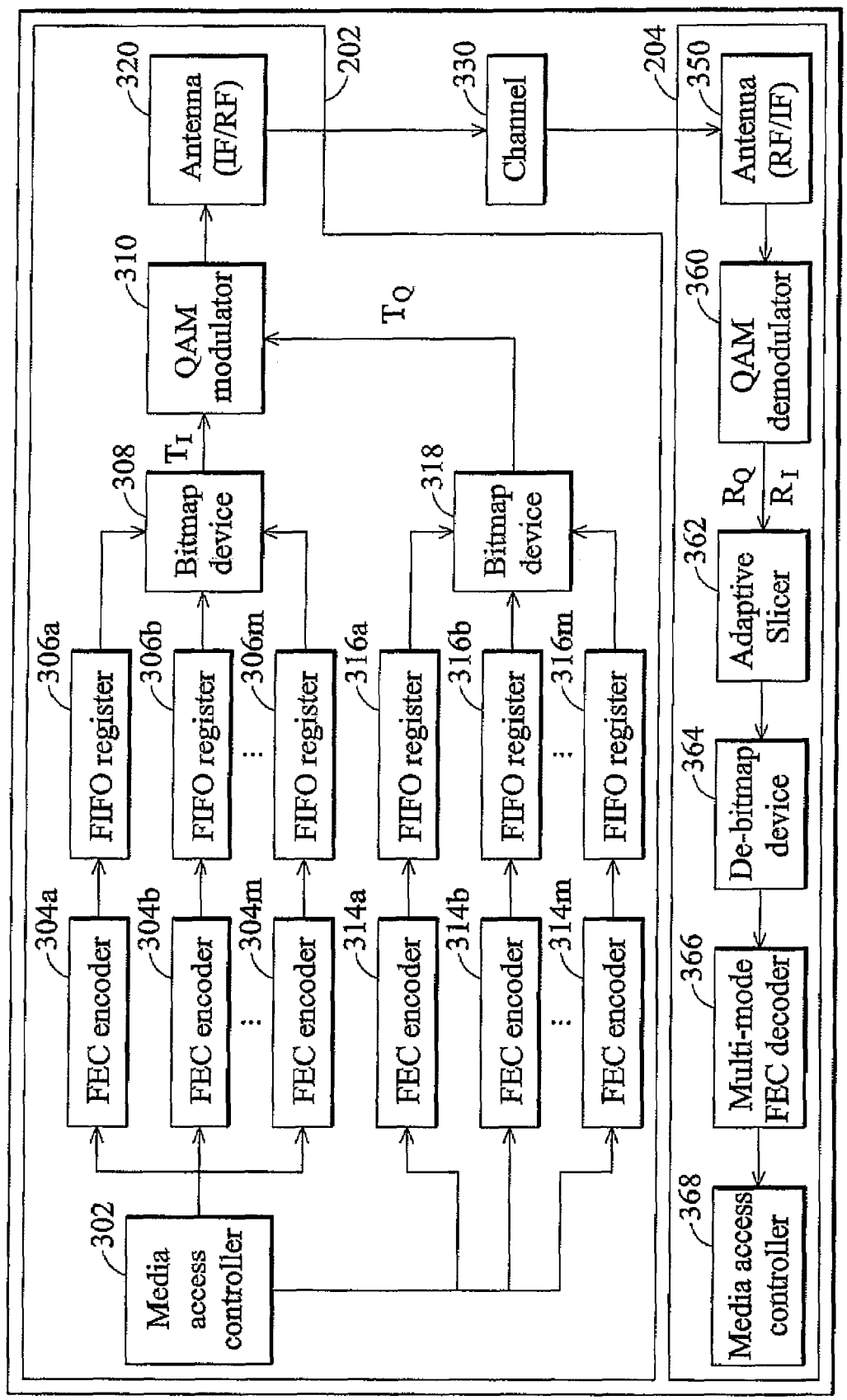
FIG. 3 is a block diagram illustrating the system structure of the scalable QAM communication system according to the embodiment of the present invention.

In FIG. 2a, the transmitter 202 sends packets to the client using the media access control (MAC) message with the corresponding type. Refer to FIG. 3 for further descriptions of sending the modulated signal to the registered client 204a~204n by the transmitter 202.

FIG. 3 illustrates the system structure of the scalable QAM communication system according to the embodiment of the present invention. As shown in the diagram, the transmitter 202 comprises a media access controller 302, two sets of forward error correction (FEC) encoders 304a~304m and 314a~314m, two sets of first in first out (FIFO) registers 306a~306m and 316a~316m, two bitmap devices 308 and 318, a QAM modulator 310, and an antenna 320. Each client 204 comprises an antenna 350, a QAM demodulator 360, an adaptive slicer 362, a de-bitmap device 364, a multi-mode FEC decoder 366, and a media access controller 368.

The media access controller 302 of the transmitter 202 sends M different types (type 1 to type M) of media access control (MAC) messages. The different types of MAC messages control and arrange different data payloads according to different MAC headers.

The different types (type 1 to type M) of MAC messages are sent to the FEC encoders 304a~304m and 314a~314m for channel encoding. After channel encoding, the bit data output from the FEC encoders 304a~304m is then sent to the corresponding FIFO registers 306a~306m and the bitmap device 308. The bitmap device 308 assigns the different types of bit data to different bit positions, and combines data of different bit positions to generate an I component signal $T_I$. Conversely, the bit data output from the FEC encoder 314a~314m is sent to the corresponding FIFO register 316a~316m and the bitmap device 318. The bitmap device 318 assigns the different types of bit data to different bit positions, and combines data of different bit positions to generate a Q component signal $T_Q$.

Figure 4:
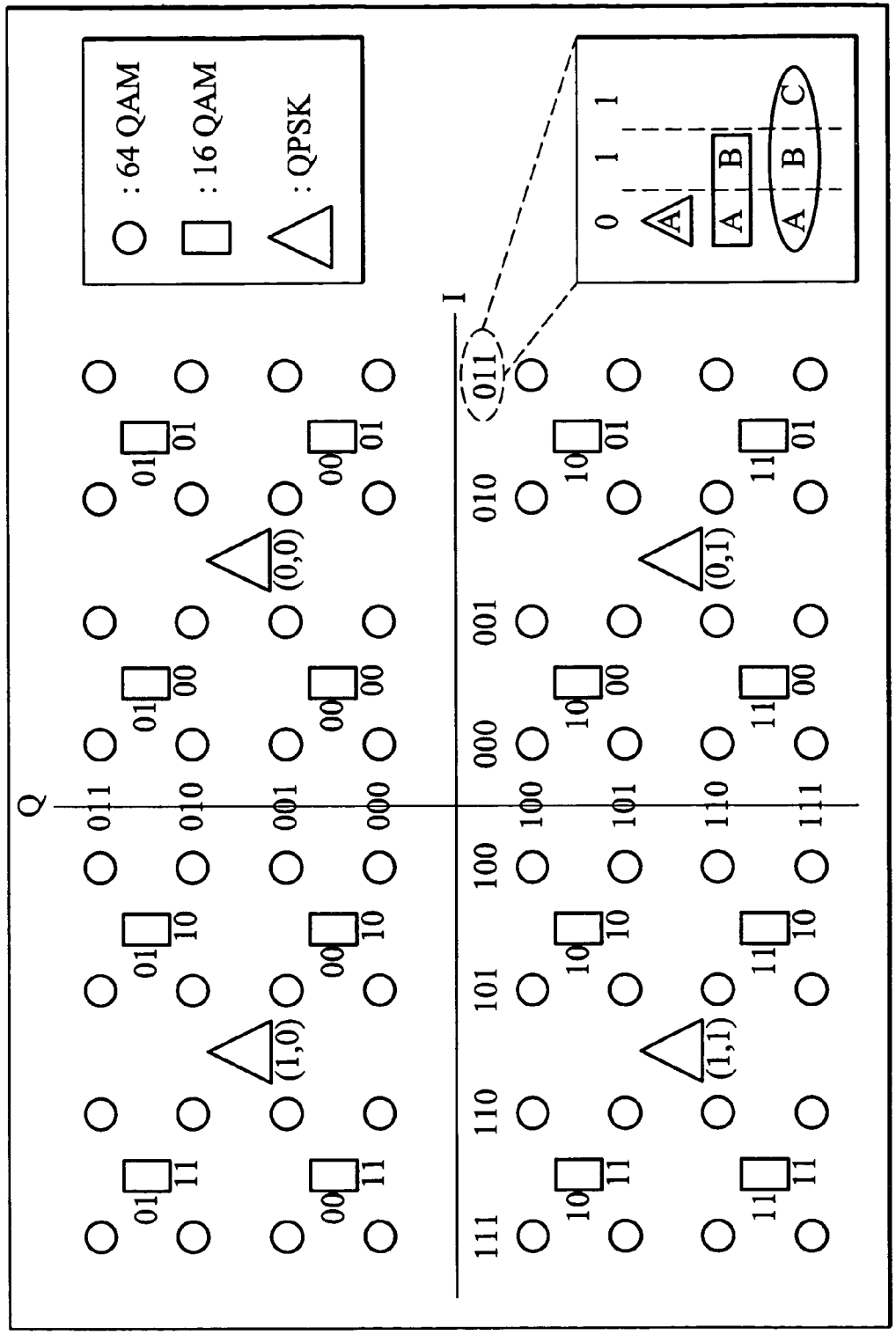
FIG. 4 is a constellation diagram showing the data distribution of QPSK, 16QAM, and 64QAM modulation.

The highest level QAM modulated signal broadcast by the transmitter 202 is assumed to be a 64QAM signal (i.e. M=3) in the following description. As shown in FIG. 4, when considering all three bit positions of the I axis and the Q axis, the first level of the 64QAM data can be composed by matching the bit data of the type 1 MAC message to the bit position of the MSB, and the bit data of the type 2 MAC message to the bit position of the second MSB, and the bit data of the type 3 MAC message to the bit position of the least significant bit (LSB). The second level of the 64QAM data can be composed by matching the first two MSB bits of the I axis and the Q axis, and the third level of the data can be composed by matching the first MSB bit of the I axis and the Q axis. The description of FIG. 4 also explains the operation of the bitmap device 308 in FIG. 3.

Data located in different bit positions generated by the bitmap devices 308 and 381 require different MAC messages for controlling and scheduling. If the highest level of the QAM modulated signal is a 64QAM signal, the bit data of the type 1 MAC message corresponds to the bit positions of the MSB in the bitmap device 308. Thus, bit data of the type 1 MAC message is broadcast to all registered clients or unicast to clients able to demodulate QPSK, 16QAM or 64QAM modulated signals. The bit data of the type 2 MAC message corresponds to the bit positions of the second MSB, thus the bit data of the type 2 MAC message is the data unicast to clients who can demodulate the 16QAM or 64QAM modulated signals correctly. Furthermore, the bit data of the type 3 MAC message corresponds to the bit positions of the LSB, thus the data of the type 3 MAC message is the data for clients with SNR high enough to demodulate the 64QAM modulated signal.

QAM modulator 310 receives the I component signal $T_I$ and the Q component signal $T_Q$, and modulates $T_I$ and $T_Q$ according to the QAM modulation technique. The antenna 320 transmits the quadrature amplitude modulated signal on the channel 330.

The QAM demodulator 360 of the client 204 first demodulates the signal received by the antenna from the channel 330 into an I component symbol $R_I$ and a Q component symbol $R_Q$. In the case of 64QAM, the I component symbol RI and the Q component symbol RQ can be expressed by three bits, and the bit expression manner of the I component symbol $T_I$ and the Q component symbol $T_Q$ in the client 204 is the same as the I component symbol $T_I$ and the Q component symbol $T_Q$ in the transmitter 202. The I component symbol RI and the Q component symbol RQ are sent to the de-bitmap device 364 after the adaptive slicer 362. The de-bitmap device 364 partitions each bit in the I component symbol $R_I$ and the Q component symbol $R_Q$ according to the bit position of each bit.

The multi-mode FEC decoder 366 determines whether to demodulate all data on the bit plane or only a portion of the data on certain bit positions according to the transmission quality of the received signal. If the signal received by the client 204 has a high SNR, the client 204 can precisely demodulate all type 1, type 2, and type 3 MAC messages. For example, the SNR of the signal must be approximately 25 dB when the 64QAM modulated signal is chosen to be the highest level QAM modulated signal. If the signal received by the client 204 has a slightly lower SNR, the client 204 is able to demodulate type 1 and type 2 MAC messages with an acceptable bit error rate. If the SNR of the received signal is lower however, the client 204 can only demodulate the type 1 MAC message. In the other words, the first level which is also the complete 64 QAM data can be demodulated by the type 1, type 2, and type 3 MAC messages, the second level data can be demodulated by the type 1 and type 2 MAC messages, and the third level data can only be demodulated by the type 1 MAC message. The media access controller 368 receives the demodulated MAC message and obtains the data payload therein.

To conclude, the scalable QAM communication technique disclosed in the present invention provides a modulation method comprising a transmitter for broadcasting a single high level QAM modulated signal, and combines the scalable frame structure control of the MAC layer and the bitmap method of the physical layer to distribute the bit information in different bit positions for transmission. Each client can decide to receive all the data on the bit plane or only a portion of the data on certain bit positions according to the transmission quality of the received signal.

By implementing this scalable QAM communication technique, all clients are able to obtain data with a low bit error rate by trading off the transmission bit rate. The system implemented the present invention can achieve robust transmission as well as maintaining a better bandwidth efficiency (bits/s/Hz).

By implementing the technique of the present invention in the cable system, both the source and the channel are scalable, hence the service provider can provide transmission services in a more efficient manner. If the existing scalable source of the cable system implements the scalable QAM technique of the present invention, the service provider is able to provide each client with a different class of service, for example, multi-resolution digital video. Different classes of sources combined with the present invention allows service providers to distribute different services to each client, for example, a portion of the bits are used to carry digital video data, while another portion carries information for Voice over Internet Protocol (VoIP) or video conference data.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A scalable quadrature amplitude modulation (QAM) communication method, comprising the steps of:
    distributing bit data in different bit positions for transmission;
    combining the bit data in different bit positions into a combined signal;
    modulating the combined signal according to a quadrature amplitude modulation (QAM) technique into a modulated signal;
    broadcasting the modulated signal over a channel;
    receiving the modulated signal transmitted over the channel; and
    determining whether to decode all data on a bit plane or a portion of the data on certain bit positions according to a transmission quality of the received signal.

2. The communication method according to claim 1, wherein distributing the bit data in different bit positions further comprises the steps of:
    sending different types of media access control (MAC) messages;
    generating different types of bit data using different types of channel encoding methods to encode the different types of MAC messages; and
    assigning the different types of bit data to different bit positions.

3. A communication method of scalable quadrature amplitude modulation (QAM) for a scalable QAM communication system comprising a transmitter and a plurality of clients, comprising the steps of:
    the transmitter distributing bit data in different bit positions for transmission;
    the transmitter combining the bit data in the different bit positions into a combined signal;
    the transmitter modulating the combined signal according to a quadrature amplitude modulation (QAM) technique into a modulated signal;
    the transmitter broadcasting the modulated signal over a channel;
    each client receiving the modulated signal transmitted over the channel; and
    each client determining whether to decode all data on a bit plane or a portion of the data on certain bit positions according to the transmission quality of the received signal.

4. The communication method according to claim 3, wherein the transmitter distributing the bit data in the different bit positions further comprises the steps of:
    sending different types of media access control (MAC) messages;
    generating different types of bit data using different types of channel encoding methods to encode the different types of MAC messages; and
    assigning the different types of bit data to the different bit positions.

5. The communication method according to claim 3, wherein each client receives the data transmitted over the channel from the transmitter after completing a registration procedure.

6. The communication method according to claim 5, the registration procedure further comprising the steps of:
    the transmitter broadcasting a signal for registration over the channel;
    each of the clients determining a type of QAM modulated signal for receiving and a demodulation technique for demodulating the received signal according to the transmission quality of the signal for registration received by the client;
    the client sending an uplink request and the demodulation technique used to the transmitter;
    the transmitter receiving the uplink request from the client and building a client database in order to complete the registration; and
    the transmitter sending packets for the client using a MAC message with a corresponding type.

7. A scalable quadrature amplitude modulation (QAM) transmitter comprising:
    a media access controller, for sending different types of MAC messages;
    a plurality of encoders, for generating different types of bit data using different types of channel encoding methods to encode different types of MAC messages;
    a bitmap device, for assigning the different types of bit data to different bit positions, and combining the data of different bit positions to generate a first component signal; and
    a quadrature amplitude modulator, for receiving the first component signal and modulating the first component signal using a QAM technique.

8. The transmitter according to claim 7, further comprises:
a second set of encoders, for generating different types of second bit data using different types of channel encoding methods to encode the different types of MAC messages; and
a second bitmap device, for mapping different types of the second bit data to different bit positions, and combining the data of different bit positions to generate a second component signal; wherein the quadrature amplitude modulator, for receiving the first and the second component signals and modulating the first and the second component signals using the QAM technique.

9. A scalable quadrature amplitude modulation (QAM) communication system comprising:
a transmitter, for distributing bit data in different bit positions for transmission, combining the bit data in different bit positions, modulating the combined bit data according to a quadrature amplitude modulation (QAM) technique into a modulated signal, and then broadcasting the modulated signal over a channel; and
a plurality of clients, for receiving a signal from the channel, and determining whether to decode all data on a bit plane or a portion of the data on certain bit positions according to the transmission quality of the received signal.

10. The scalable QAM communication system according to claim 9, wherein the transmitter further comprises:
a media access controller, for sending different types of MAC messages;
a plurality of encoders, for generating different types of bit data using different types of channel encoding methods to encode different types of MAC messages;
a bitmap device, for assigning different types of the bit data to different bit positions, and combining the data of the different bit positions to generate a first component signal;
a second set of encoders, for generating different types of second bit data using different types of channel encoding methods to encode the different types of MAC messages;
a second bitmap device, for mapping different types of the second bit data to different bit positions, and combining the data of the different bit positions to generate a second component signal;
a quadrature amplitude modulator, for receiving the first and the second component signals and modulating the first and the second component signals using the QAM technique; and
an antenna, for transmitting the signals modulated using the QAM technique to a channel.

11. The scalable QAM communication system according to claim 9, wherein each of the clients comprises:
an antenna, for receiving an input signal from the channel;
a quadrature amplitude demodulator, for demodulating the input signal into a first symbol and a second symbol, wherein the first and the second symbols are formed by an equal number of bits;
a de-bitmap device, for partitioning each bit of the first and the second symbols according to the bit position of each bit; and
a multi-mode decoder, for determining whether to decode all data on the bit plane or data on a portion of the bit positions according to the transmission quality of the input signal.

12. The scalable QAM communication system according to claim 9, wherein the transmitter broadcasts a signal for registration over the channel.

13. The scalable QAM communication system according to claim 12, wherein each of the clients determines the type of QAM modulated signal to receive and the type of demodulation method for demodulating the received signal according to the transmission quality of the registration signal received by the client, and sending an uplink request and the demodulation method used by the client to the transmitter.

14. The scalable QAM communication system according to claim 13, wherein the transmitter builds a client database after receiving the uplink request from a client to complete registration, and the transmitter sends packets for the client using a MAC message with a corresponding type.

* * * * *